United States Patent Office 3,460,980
Patented Aug. 12, 1969

3,460,980
PROCESS FOR THE APPLICATION OF A FURTHER CURABLE ORGANOPOLYSILOXANE TO METAL
Alfred J. Burzynski, Toledo, Ohio, assignor to Owens-Illinois, Inc., a corporation of Ohio
No Drawing. Filed Dec. 3, 1965, Ser. No. 511,324
Int. Cl. B44d 1/36; C09d 1/82
U.S. Cl. 117—132                                    12 Claims

ABSTRACT OF THE DISCLOSURE

Process of providing a hard, wear resistant, weather resistant, chemical resistant, and easily cleaned coating on articles having a metal surface by applying to the surface a solvent-soluble, further curable, organopolysiloxane in an organic solvent and thereafter evaporating the solvent and finally curing the organopolysiloxane. The solvent-soluble, further curable, organopolysiloxane is made in a certain way by heating methyltrialkoxysilane or mixtures of methyltrialkoxysilane and phenyltrialkoxysilane in water at 50 to 80° C. for 1 to 10 hours to form a partial condensation product, heating this product at about 80° to 300° C. to remove alkanol by-product and water, and thereafter heating the product below the gel point at from about 90° to 185° C. to provide the solvent-soluble, further curable organopolysiloxane.

This invention generally relates to organopolysiloxane coating compositions, processes for the application of the same and articles which are coated with these compositions. The invention is specifically concerned with an organopolysiloxane coating composition which can be applied to metal.

A large number of coating compositions for metal are generally known in the prior art. However, these coating compositions are generally deficient in that they are difficult to apply, and possess poor hardness and aging qualities. Likewise, most coatings cannot be applied to a substrate in such a state to permit the working of said substrate (stamping, extruding, bending, etc.) and then be finally cured subsequent to forming. This latter mentioned point is particular important when the coated object is wire or sheet metal which is to be bent or stamped. These prior art coating compositions are also susceptible to attack by solvents, have poor heat resistance and are detrimentally affected by ultraviolet and infrared radiation. Likewise, these prior art coating compositions generally show poor fungal and bacterial resistance.

Generally, there has been a long felt need in the paint industry for a coating composition for metal which will overcome these difficulties. Accordingly, it is the object of this invention to produce a coating composition which can be easily applied, has excellent hardness and hence excellent wear and cleaning characteristics. Likewise, it is an object of this invention to produce a coating composition for metals which is not detrimentally affected by solvents and is not degraded by visible, ultraviolet or infrared radiation. Finally, it is the object of this invention to produce a coating for aluminum and copper which has outstanding weathering characteristics.

These objects are accomplished by the use of a partially polymerized trifunctional organosiloxane compound as a coating composition, followed by the further in situ polymerization of this organosiloxane compound. The coating compositions of this invention generally comprise solvent solutions or organopolysiloxane compounds.

Organopolysiloxane compounds which are adapted for use in the subject invention are produced by the hydrolysis and condensation of at least one component embraced by Formula I.

(I)     $T_nSiZ_{(4-n)}$ wherein T independently generally represents a member such as alkyl, alkenyl and aryl. More specifically, T is independently a member such as alkyl, e.g., methyl, ethyl, and propyl through hexyl (both normal and isomeric forms), cyclopentyl, cyclohexyl, vinyl and the normal and isomeric forms of propenyl through hexenyl and phenyl; Z independently generally represents a hydrolyzable group. More specifically Z is independently a member such as halogen (chloride, bromine, fluorine and iodine), alkoxy (e.g., methoxy through heptoxy), and acyloxy (e.g., acetoxy, propionoxy, butyroxy, pentanoxy, hexanoxy, etc.) and aryloxy, e.g. phenoxy; and $n$ represents a positive integer of less than 4 but is preferably one.

In Formula I, as given above for substituent, alkoxy groups are preferred because their hydrolysis products are less acidic, and therefore, the siloxane condensation can be better controlled. Alkoxy groups of less than 5 carbon atoms are especially advantageous (and are preferred) for the radical represented by Z in Formula I, because the rate of hydrolysis can be inconveniently slow when the organic hydrolyzable radical(s) have a higher molecular weight (i.e., more carbon atoms).

It will be understood, of course, by those skilled in the art that some or all of the Z's in Formula I can also represent an —OH group. Hence, the term "hydrolyzable" as used herein and in the appended claims is intended to include within its meaning compounds wherein the hydrolyzable group or groups have already been hydrolyzed to an —OH group or groups, unless it is clear from the context that the more limited meaning is intended. The terms "hydrolysis" product and "condensation" product as used in the preceding paragraph and elsewhere in this specification, and in the appended claims, are intended to include within their meaning the co-hydrolysis and co-condensation products that result when mixtures of silicon-containing starting reactants are employed.

Preferred organosiloxane compositions adapted for use in this invention consist essentially of a solvent solution of a compound represented by Formula II

II

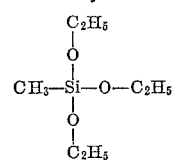

or a solvent solution of a mixture of compounds as represented by Formulae III and IV

III

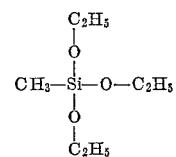

IV

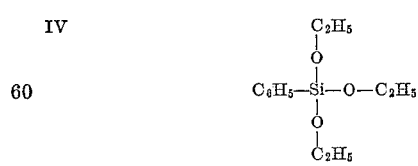

During the in situ polymerization compounds III and IV link together to form a copolymer. The molar ratio of the compound as represented by Formula III to the compound as represented by Formula IV can be from 1:10 to 10:1 with a more preferred ratio being 1:5 to 5:1. A most preferred composition is produced by the condensation of 2 moles of the compound as represented by Formula III with one mole of the compound as represented by Formula IV. Up to 10 mole percent but preferably up to 5 mole percent of diphenylsilanediol can be incorporated into the copolymer that is produced by the condensation of compounds as are represented by Formulae III and IV by co-condensation.

In the subject invention at least one monomeric organosilane compound as is represented by Formulae I, II, III and IV is converted into a solid organopolysiloxane coating by the following general procedure. The organosilane compound or compounds are hydrolyzed at a temperature of from about 50 to about 80° C. for a period of time of from about 1 to about 10 hours, in the presence of water. The temperature is then raised to from about 80° to about 300° C. for a period of time of from about 1 minute to about 30 minutes to effect the removal of the by-product alcohol and excess water. This also effects the further condensation of the product to produce a heat-curable organopolysiloxane. This partially condensed organopolysiloxane is then dissolved in a solvent as will be described herein below. The heat-curable organopolysiloxane is then partially cured at a temperature of from about 90 to about 185° C. for a period of time of from about ½ to about 24 hours. This partially cured product is then finally cured at a temperature of from about 90 to about 260° C. for a period of time of from about 30 seconds to about 168 hours.

The composition and preparation of the above described monomeric organosilane compounds and their subsequent polymerization and copolymerization is fully discussed in copending U.S. patent application, Ser. No. 306,344, filed Sept. 3, 1963 now abandoned and U.S. patent application, Ser. No. 370,684, filed May 27, 1964 now abandoned, these applications having an assignee that is common with the assignee of this invention.

During condensation the above discussed organosiloxane compounds cross-link to form compounds that exhibit exceptional physical properties such as stability and hardness. It is thought that the exceptional weathering properties which are effected by the coating of the invention are due to the cross-linking.

The coating compositions of this invention generally comprise from about 5 to about 85 percent by weight of an organopolysiloxane composition as described above, the balance of the coating composition being the solvent. A more preferred coating composition comprises a solution containing from about 40 to about 60 percent by weight of the organopolysiloxane, with a most preferred concentration being 50 percent by weight. While a plurality of solvents can be utilized in this invention, polar solvents are particularly adapted for use in this phase of the invention. Examples of solvents which are adapted to the subject invention include methanol, ethanol, butanol, acetone, ethyl acetate, dioxane, benzene, xylene, toluene, ethylene glycol monomethyl ether, ethylene glycol monomethyl ether acetate, ethylene glycol ethyl ether, ethylene glycol ethyl ether acetate, ethylene glycol ethyl butyl ether, ethylene glycol butyl ether acetate, ethylene glycol dibutyl ether, ethylene glycol monohexyl ether, ethylene glycol monophenyl ether, etc.

The compositions of the invention at hand can be applied to many types of metals and metal products for example, ferrous and non-ferrous metals and alloys of these metals. However, the compositions of this invention are particularly suited for the treatment and finishing of aluminum and copper surfaces where a hard, wear resistant, weather resistant surface is desirable. Coatings of this type are particularly desirable when aluminum and copper are utilized as building and trim materials.

The compounds applicable to the subject invention as described above have greater residual functionality than usual silicones made from difunctional monomers, that is, they contain more sites at which polymerization can take place. Because of this, these compounds cross-link during curing so as to impart a hard, tough, solvent and heat resistant surface to the metal surface which is being treated. Likewise, due to the trifunctional nature of the coating compositions of this invention, these compositions tend to bond with the metal surface that is being coated.

Other advantages of this invention include the fact that the surfaces which are treated tend to be resistant to attack by bacteria and fungi. This property is particularly important where the coated metal surface is exposed to environments where bacteria and fungi are present. The organopolysiloxane coating compositions of this invention exhibit excellent thermal stability with the result that they tend to function as a heat resistant and flame retardant barrier for the metallic substrate. The coating compositions of the invention at hand also exhibit excellent light transparency in the visible range with 90 percent or more transmission. Likewise, the subject coatings show superior solvent and water resistance. Finally, the coatings of this invention are advantageous in that they do not tend to outgas even when exposed to temperatures up to 450° C. and electron beams.

The coating compositions of the prior art tend to be degraded by ultraviolet and visible radiation. Conversely, the coating compositions of this invention allow almost complete passage of ultraviolet and visible radiation. Due to these non-absorbency qualities, the coating compositions of this invention are particularly suited for outdoor use in that they are not susceptible to degradation by the various wavelength of radiation contained in sunlight.

The cured compositions of this invention produce coatings having a high gloss. Because the coatings of this invention are not affected by ultraviolet, visible or infrared radiation, this high gloss is retained when the coatings are exposed to sunlight and weather for extended periods of time. It is to be noted that by the appropriate addition of additive components, the high gloss finish of the subject coating compositions can be eliminated to produce a semi-gloss surface.

Regardless of the above described radiation passage properties, the compositions of this invention can be doped in such a way that the treated surface is likewise not susceptible to degradation. That is, small percentages of various radiation absorbing compounds can be added to the compositions of this invention which will effectively block the passage of harmful radiation through to the treating surface. This problem is particularly acute in metal surfaces which must be exposed to sunlight where the pigments and dyes tend to be bleached by sunlight, for example, colored anodized aluminum surfaces. When the coating compositions of this invention are utilized, small percentages of selected doping agents can be added to the coating composition which will effectively absorb the harmful radiation thereby leaving the treating surface in an unbleached state.

It is to be noted that the subject organopolysiloxane compositions are particularly suited to doping with ultraviolet light absorbing compounds. The coating compositions of this invention can contain any percentage of a radiation absorbing compound up to a saturated solution. Preferred coating compositions contain only a minor amount of a radiation absorbing compound, that is from about 1 to about 5 percent of a radiation absorbing compound. Examples of radiation absorbing compounds adapted to this invention are compounds such as 2-hydroxy - 4 - methoxybenzophenone, 2,2' - dihydroxy - 4-methoxybenzophenone, etc.

The organopolysiloxane coating composition of this invention can be applied by a plurality of methods, for example brushing, spraying, rolling, etc. The subject compositions have excellent flow and viscosity characteristics with the result that they are easy to apply and the treated surfaces tend to be smooth and even, having no brush marks, etc. The viscosity of the coating composition of this invention can be carefully controlled with the result that these coating compositions can be adapted to simultaneously coat and fill a metallic surface. This property is particularly advantageous when porous articles are being treated, for example, sintered metallic surfaces.

After application of the coating compositions of this invention to a surface, it is preferred that the solvent component be evaporated and a precure effected at a temperature of from about 25 to about 185° C. Following the removal of the solvent, the final curing is effected at a temperature of from about 80 to about 135° C., for a period of time of from about 30 seconds to about 24 hours. A more preferred range of operating conditions is to evaporate the solvent and precure at a temperature of from about 130 to about 140° C., followed by a final cure at a temperature about 250 to about 260° C., for from about 30 to about 90 seconds.

It is within the purview of this invention to add to the coating compositions of this invention compatible materials which do not affect the basic and novel characteristics of these compositions. Among such materials are coloring agents, including dyes and pigments, fillers and similar additives. Additives such as antioxidants, antistatic agents, stabilizers and anti-foaming, may also be added. The upper limit of the quantity of additives is usually 50 weight percent of the coating composition.

The following examples will illustrate the invention. These examples are given for purposes of illustration and not for purposes of limiting this invention.

EXAMPLES 1–10

In all cases the metal substrates were precleaned with acetone and air dried. Subsequent to precleaning the panel of Examples 6 and 10 was treated with a 50% hydrochloric acid solution while panel of Example 7 was treated with an 8% sulfuric acid solution. This prior acid treatment tended to remove the oxide coating which was present on the metal substrate. In Examples 1–9, the metal substrates were then dipped into a 50% acetone solution of an organopolysiloxane that was prepared by the hydrolysis and condensation of two moles of methyl triethoxysilane with one mole of phenyl triethoxysilane. In Example 10, the organopolysiloxane utilized was produced by the hydrolysis and condensation of methyl triethoxysilane. The coated panels were then air dried for one hour and redipped. The panels were then cured for one hour at 90° C. and 18 hours at 135° C. The properties of the coated substrates of Examples 1–10 is shown in Tables I–III.

TABLE I.—PHYSICAL PROPERTIES

| Substrates | Flexibility | Adhesion | Film thickness, mils |
|---|---|---|---|
| (1) Aluminum | Good | Good | 0.3 |
| (2) Anodized aluminum | do | do | 0.35 |
| (3) Copper | do | do | 0.45 |
| (4) Tinplate | do | None | 0.65 |
| (5) Cold rolled steel | Poor | Good | 0.7 |
| (6) Copper, HCl treated | Good | do | 0.6 |
| (7) Copper, H$_2$SO$_4$ treated | do | do | 0.5 |
| (8) Boron | | do | 0.4 |
| (9) Stainless steel | Good | do | 0.5 |
| (10) Copper, HCl treated | do | do | 0.55 |

TABLE II.—ELECTRICAL PROPERTIES (VOLTS/MILS TO BREAKDOWN)

| Substrates | Dry | Wet |
|---|---|---|
| (1) Aluminum | 7,600 | 4,000 |
| (2) Anodized aluminum | 8,000 | 4,300 |
| (3) Copper | 4,000 | 1,300 |
| (4) Tinplate | 4,150 | 800 |
| (5) Cold rolled steel | 2,700 | 1,450 |
| (6) Copper, HCl treated | 4,000 | 1,200 |
| (7) Copper, H$_2$SO$_4$ treated | 5,000 | 1,200 |
| (8) Boron: | | |
| Large piece | 8,000–10,000 | |
| Small piece | 4,000–6,000 | |
| (9) Stainless steel | 4,700 | 2,500 |
| (10) Copper, HCl treated | 1,800 | 900 |

TABLE III.—CHEMICAL PROPERTIES

| Substrates | 5% NaCl boiling | 1% NaOH | 1% HCl |
|---|---|---|---|
| (1) Aluminum | 10 | 9 | 10 |
| (2) Anodized aluminum | 10 | 5 | 10 |
| (3) Copper | 6 | 10 | 4 |
| (4) Tinplate | 9 | 3 | 9 |
| (5) Cold rolled steel | 0 | 9 | 1 |
| (6) Cu, HCl treated | 5 | 10 | 5 |
| (7) Cu, H$_2$SO$_4$ treated | 5 | 10 | 3 |
| (8) Boron | | | |
| (9) Stainless steel | | | |
| (10) Copper, HCl treated | 5 | 10 | 1 |

| Substrates | Acetone | 24 hrs. at 200° C. |
|---|---|---|
| (1) Aluminum | Softens | 0 |
| (2) Anodized aluminum | Flaked | 0 |
| (3) Copper | Softens | 0 |
| (4) Tinplate | Flaked | 0 |
| (5) Cold rolled steel | do | 0 |
| (6) Cu, HCl treated | Softens | 0 |
| (7) Cu, H$_2$SO$_4$ treated | do | 0 |
| (8) Boron | | |
| (9) Stainless steel | Flaked | 0 |
| (10) Copper, HCl treated | Softens | 5 |

10=good. 0=poor.

What is claimed is:

1. A process for producing a coating on an article having a metal surface, the surface of the coating being easily cleaned, hard, wear resistant and resistant to attack by solvents, the process comprising the steps of:

(1) applying a solution of a solvent-soluble, further curable organopolysiloxane in an organic solvent on the metal surface, the further curable organopolysiloxane being a precured hydrolysis and condensation product of a silane of the group consisting of methyltrialkoxysilane and a mixture of methyltrialkoxysilane and phenyltrialkoxysilane in which the alkoxy group contains less than 5 carbon atoms and water at about 50° to 80° C. for about 1 to 10 hours to form a siloxane partial condensation product which is then heated at a temperature of about 80° to 300° C. to remove alkanol by-product and water, after which the resultant product is precured by heating at a temperature below the gel point thereof and in the range of about 90° to 185° C. to provide the precured, further curable organopolysiloxane, and (2) evaporating the solvent for the organopolysiloxane and finally curing the organopolysiloxane to provide a thermoset organopolysiloxane on the metal surface.

2. A process as defined in claim 1 in which the metal is copper.

3. A process as defined in claim 1 in which the metal is aluminum.

4. A process as defined in claim 1 in which the organic solvent is a member of the group consisting of methanol, ethanol, butanol, acetone, ethyl acetate, dioxane, benzene xylene, toluene, ethylene glycol monomethyl ether, ethylene glycol monomethyl ether acetate, ethylene glycol ethyl ether, ethylene glycol ethyl ether acetate, ethylene glycol ethyl butyl ether, ethylene glycol butyl ether acetate, ethylene glycol dibutyl ether, ethylene glycol monohexyl ether, and ethylene glycol monophenyl ether.

5. A process as defined in claim 1 in which an ultraviolet light absorbing compound is applied to the metal surface in admixture with the further curable organopolysiloxane to thereby protect the metal surface from ultraviolet light radiation.

6. A process as defined in claim 5 in which the ultraviolet light absorbing compound is 2-hydroxy-4-methoxybenzophenone.

7. A process as defined in claim 1 in which the silane is methyltrialkoxysilane.

8. A process as defined in claim 1 in which the silane is methyltriethoxysilane.

9. A process as defined in claim 1 in which the silane is a mixture of methyltrialkoxysilane and phenyltrialkoxysilane.

10. A product produced by the process defined in claim 1.

11. A product as defined in claim 10 in which the metal is copper.

12. A product as defined in claim 10 in which the metal is aluminum.

References Cited

UNITED STATES PATENTS

| | | | |
|---|---|---|---|
| 2,375,998 | 5/1945 | McGregor et al. | 260—46.5 |
| 2,450,594 | 10/1948 | Hyde | 260—46.5 |
| 2,605,194 | 7/1952 | Smith | 117—132 |
| 3,125,597 | 3/1964 | Wahl et al. | 117—33.3 X |
| 3,257,330 | 6/1966 | Burzynski et al. | 260—46.5 X |
| 3,354,095 | 11/1967 | Burzynski et al. | 260—46.5 X |
| 3,367,910 | 2/1968 | Newing | 260—46.5 X |

RALPH S. KENDALL, Primary Examiner

U.S. Cl. X.R.

117—161; 260—37, 46